United States Patent Office

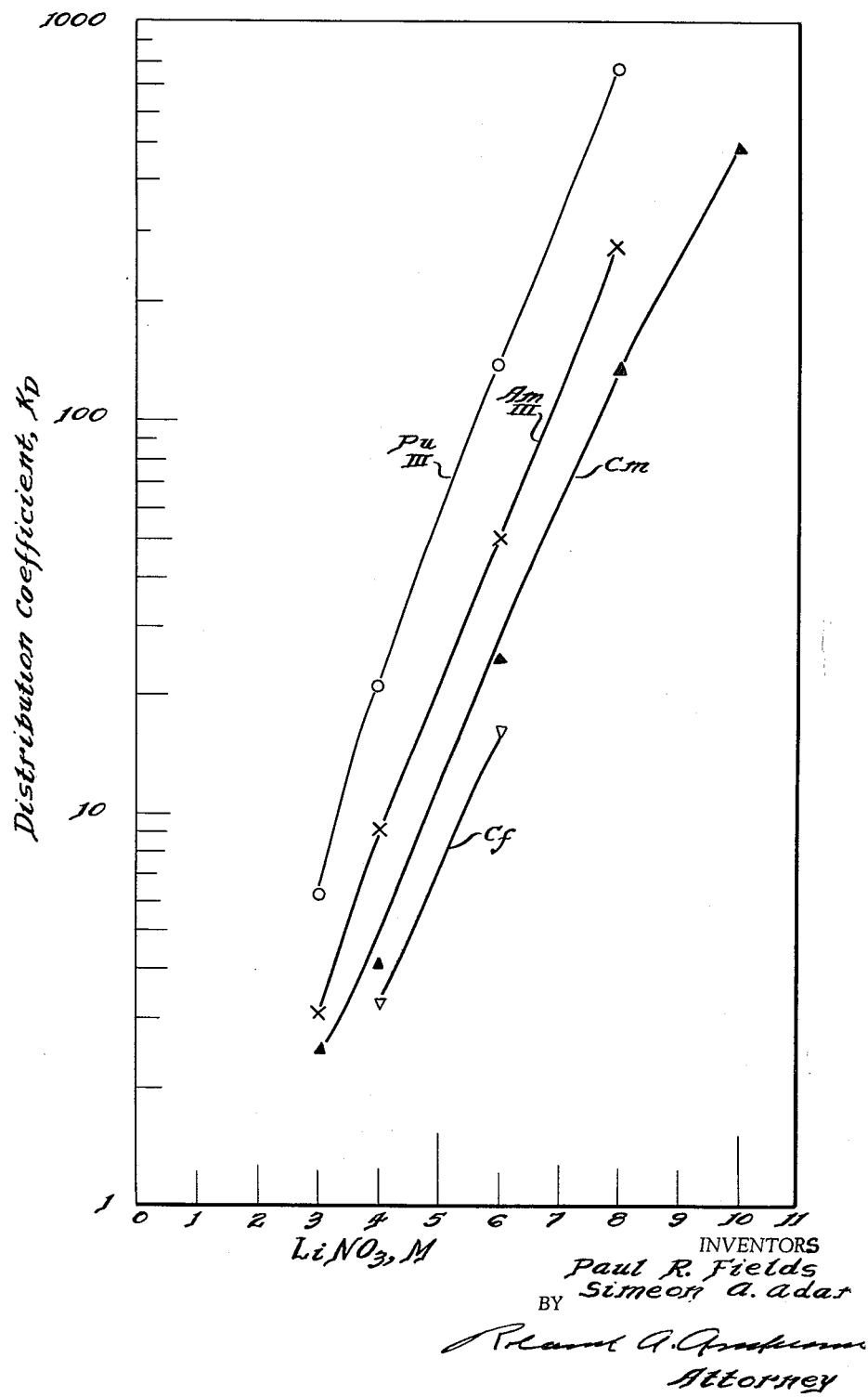

3,136,600
Patented June 9, 1964

3,136,600
SEPARATION OF ACTINIDES FROM
EACH OTHER
Simeon A. Adar, Beersheba, Israel, and Paul R. Fields, Chicago, Ill., assignors to the United States of America as represented by the United States Atomic Energy Commission
Filed Aug. 15, 1962, Ser. No. 217,785
9 Claims. (Cl. 23—14.5)

This invention deals with a process of separating actinide values from each other, and in particular with an anion exchange process.

Aqueous solutions containing actinides and lanthanides have been treated heretofore with anion exchange resins for the purpose of their separation. Lithium chloride solutions of the actinides were used in these processes; both the lanthanides and actinides were adsorbed on the resin, the degree of adsorption increasing with increasing atomic numbers. An elution then with an aqueous lithium chloride solution did not bring about any fractionation of the actinides, but it accomplished a separation of the lanthanides from the actinides, the lanthanides being desorbed first and the actinides then being eluted as a group. By adding a small amount of nitric acid in that process, elution of the plutonium was prevented; a subsequent stripping with hydrochloric acid then accomplished elution of the plutonium. This process is described in assignee's U. S. Patent No. 2,887,358, granted to G. H. Higgins et al. on May 19, 1959.

According to another process used heretofore, a mixture of americium, curium and rare earths has also been absorbed on anion exchange resins from an aqueous 8 M lithium nitrate solution. There a selective elution of the rare earths was accomplished with a 10 M solution of lithium chloride, and thereafter the americium and curium were co-eluted with 1 M lithium chloride.

It is an object of this invention to provide a process for the separation of actinides in which very little decomposition of the materials takes place under the effect of radioactivity.

It is another object of this invention to provide a process for the separation of actinides wherein hydrogen peroxide, whatever formed by radioactivity, does not impair the distribution coefficients.

It is finally also an object of this invention to provide a process for the separation of actinides, which requires relatively small volumes of materials so that it is easily adaptable to remote control operation.

Most surprisingly, it was found that lithium nitrate as an eluant behaves radically differently from lithium chloride. The adsorption of actinides from lithium nitrate solutions increases with decreasing atomic number, plutonium being more strongly adsorbed than americium, americium more strongly than curium and curium more strongly than californium. When an aqueous lithium nitrate solution is then passed through the resin holding the actinides, the elution is fractional, that is the actinides with the higher atomic numbers come off before those with the lower atomic numbers. However, an elution with lithium nitrate does not accomplish a separation of lanthanides from actinides; this separation can be carried out, if desired, in a pretreatment by known processes.

The invention is based on these findings. This process comprises preparing a feed solution by dissolving the actinide salts to be separated in an aqueous lithium nitrate solution; contacting an anion exchange resin with said feed solution, whereby all actinides are adsorbed on the resin; and eluting the actinides with an aqueous lithium nitrate solution of a concentration between 3 and 8 M, while collecting the effluent or eluate in fractions, whereby the actinides are removed from the resin one after the other in the order of decreasing atomic numbers.

The lithium nitrate concentration of the feed solution may vary widely, but a concentration of between 7 M up to saturation was found best suitable, an 8 M lithium nitrate solution being preferred. The concentration of the actinides is not critical. The concentration of free nitric acid in the feed solution is best not higher than .01 M. The actinides should be in the trivalent state to obtain the fractional elution in the order of decreasing atomic numbers. To maintain some actinides in, or convert them to, the trivalent state, the addition of a reducing agent, such as ferrous sulfamate (about 0.005–0.1 M), or hydroxylamine, is advisable.

All anion exchange resins are suitable for the process of this invention, but strong-base anion exchange resins gave the best results. For instance, cross-linked polystyrene polymers having quaternary amine substituents proved very satisfactory. The preferred resin was the resin sold under the trade name Dowex 1, which is a resin made according to the process disclosed in column 2, line 36, to column 3, line 22, of U.S. Patent No. 2,559,529, granted to William C. Bauman on July 3, 1961. A volume ratio of from 6 to 10 volumes of the resin per one volume of feed solution was found to be the optimum. The resin is advantageously pre-equilibrated with a saturated aqueous lithium nitrate solution.

For the elution of the actinides, an aqueous lithium nitrate solution of a concentration between 3 and 8 M can be used, but the concentration is preferably about 5 M. When the solutions have the higher concentrations within this range, say above 5 M, higher flow rates can be used if the solutions are heated, for instance, to between 80 and 90° C. However, the distribution coefficients of the various actinides are higher and farther apart at room temperature. The quantity of eluant, of course, is dependent upon the amount of actinides adsorbed on the resin. From about 300 to 700 milliliters of eluant per gram of actinide were found to be satisfactory, the specific amount depending on the actinides to be separated and the concentration and temperature of the solution. The eluant was collected in fractions to obtain the separation of the actinides intended.

In the accompanying drawing a number of curves are shown that demonstrate the relationship of distribution coefficient (quantity of actinide on resin: quantity of actinide in feed solution) and molarity of the lithium nitrate concentration in the feed solution; the runs that resulted in these curves were carried out at room temperature. It will be seen from these curves that at all lithium nitrate concentrations used, namely between 3 and 10 M, the trivalent plutonium showed the highest distribution coefficient and the californium the lowest distribution coefficient. (Tetravalent plutonium was found to be held more strongly by the resin and to have a higher distribution coefficient than trivalent plutonium.) It is also obvious from this diagram that at the same lithium nitrate concentrations the distribution coefficients vary distinctly, which means that good separation factors can be obtained in the fractional elution of the actinides.

In the following, two examples are given to illustrate the process of this invention.

*Example I*

Twenty ml. of an aqueous 8 M lithium nitrate solution containing 500 mg./l. of Pu (III) nitrate, 500 mg./l. of Am (III) nitrate, 500 mg./l. of Cm (III) nitrate and 500 mg./l. of Cf (III) nitrate are passed over 10 grams of Dowex 1 resin having a settling rate of 0.5–0.8 cm./min. The feed solution also contains ferrous sulfamate as a reducing agent in a concentration of 0.04 M.

Thereafter 500 ml. of a 5 M aqueous solution of lithium nitrate containing 0.01 M free nitric acid are passed through the resin, and the effluent is collected in 40-ml. fractions. Each effluent fraction is analyzed. The concentrations of the various effluents in the various actinides are shown in the table below.

| Eluant fractions, ml. | Cf (III), mg. | Cm (III), mg. | Am (III), mg. | Pu (III), mg. |
|---|---|---|---|---|
| 0-40 | 9.9 | 0.1 | | |
| 40-80 | 0.1 | 9.9 | 0.6 | |
| 80-120 | | | 9.0 | 0.02 |
| 120-500 | | | 0.4 | 9.9 |

The following example was carried out at a temperature of 85° C.

*Example II*

A feed solution was used containing 20 mg. of curium$^{244}$ and 50 mg. of americium $^{243+241}$, lithium nitrate in a concentration of 8 M and nitric acid in a concentration of less than 0.01 M. Ten milliliters of this feed solution were passed over 10 grams of Dowex 1 resin that was cross-linked to 8%; the resin was in the form of a column 1 cm. in diameter and 11 cm. high. The particle size of the resin was determined by its settling rate, which was between 0.5 and 0.8 cm. per second.

After adsorption, a total of 46 ml. of eluant was passed over the resin at a flow rate of 0.8 ml./min; this eluant was 4.2 M in lithium nitrate and 0.01 M in nitric acid.

The effluent was collected in 2-ml. fractions, and each fraction was analyzed. The first 16 fractions together contained 96% by weight of the total curium and about 10% of the americium. The remaining 7 fractions contained 4% of the curium and 90% of the americium.

It will be understood that the invention is not to be limited to the details given herein but that it may be modified within the scope of the appended claims.

What is claimed is:

1. A process of separating trivalent actinide values from each other, comprising preparing a feed solution by dissolving said actinide values in an aqueous lithium nitrate solution of a concentration above 7 M; contacting an anion exchange resin with said feed solution, whereby the actinides are adsorbed on the resin; and contacting the actinides-containing resin with an aqueous lithium nitrate solution of a concentration between 3 and 5 M, while collecting the effluent in fractions, whereby said actinides are removed from the resin in the order of decreasing atomic numbers.

2. The process of claim 1 wherein the feed solution contains lithium nitrate in a concentration above 7 M and up to saturation.

3. The process of claim 2 wherein the lithium nitrate concentration of the feed solution is about 8 M.

4. The process of claim 1 wherein the lithium nitrate concentration of the eluant is between 4 and 5 M.

5. The process of claim 1 wherein the nitric acid concentrations of both feed and eluant are a maximal 0.01 M.

6. The process of claim 1 wherein the feed solution contains a reducing agent to secure the actinides in their trivalent state.

7. The process of claim 1 wherein the anion exchange resin is a quaternary-amine-substituted cross-linked polystyrene polymer.

8. The process of claim 1 wherein the feed and the eluant have a temperature of approximately 25° C.

9. A process of separating actinide values from each other, comprising preparing a feed solution by dissolving said actinide values in an aqueous lithium nitrate solution of a concentration of about 8 M; adjusting the acidity of said feed solution to a maximum of 0.01 M; maintaining said actinides in said feed solution in their trivalent oxidation state; contacting a strong-base anion exchange resin with said feed solution, whereby the actinides are adsorbed on said resin; and contacting said resin with an aqueous lithium nitrate solution of a concentration between 4 and 5 M and a maximum acidity of 0.01 M and at the same time collecting the effluent in fractions, whereby the first fractions preferentially contain the actinide values of higher atomic number and subsequent fractions the actinides in the order of decreasing atomic numbers.

References Cited in the file of this patent

UNITED STATES PATENTS 3,079,255    Baybarz _____ Feb. 26, 1963